(12) United States Patent
Inada et al.

(10) Patent No.: US 6,220,036 B1
(45) Date of Patent: Apr. 24, 2001

(54) COOLING STRUCTURE FOR COMBUSTOR TAIL PIPES

(75) Inventors: Mitsuru Inada; Kouichi Akagi; Jun Kubota; Koji Watanabe; Yoshichika Sato, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/194,016

(22) PCT Filed: Apr. 9, 1998

(86) PCT No.: PCT/JP98/01641

§ 371 Date: Nov. 18, 1998

§ 102(e) Date: Nov. 18, 1998

(87) PCT Pub. No.: WO98/46873

PCT Pub. Date: Oct. 22, 1998

(30) Foreign Application Priority Data

Apr. 15, 1997 (JP) .................................................. 9-097281

(51) Int. Cl.[7] ................................ F02C 3/30; F02C 6/18; F02C 7/16; F23R 3/00
(52) U.S. Cl. ................................ 60/752; 60/757; 60/760
(58) Field of Search .................................. 60/39.37, 730, 60/752, 757, 760, 267

(56) References Cited

U.S. PATENT DOCUMENTS 4,055,044 * 10/1977 Dederra et al. ........................ 60/267
4,195,474 * 4/1980 Bintz et al. .......................... 60/39.37
5,802,841 * 9/1998 Maeda .................................... 60/760
5,906,093 * 5/1999 Coslow et al. .......................... 60/752

FOREIGN PATENT DOCUMENTS

| 62-111131 | 5/1987 | (JP) . |
| 5-044494 | 2/1993 | (JP) . |
| 8-021207 | 1/1996 | (JP) . |
| 9-209778 | 8/1997 | (JP) . |
| 97/14875 | 4/1997 | (WO) . |

* cited by examiner

Primary Examiner—Ted Kim
(74) Attorney, Agent, or Firm—Wenderoth, Lind & Ponack, L.L.P.

(57) ABSTRACT

Gas turbine combustor tail tube cooling structure is improved so that temperature distribution along tail tube axial direction is made gentle and large thermal stress is prevented from occurring resulting in enhancement of safety and reliability of the combustor tail tube. Supply jacket (16) is disposed between upstream side discharge jacket (14) and downstream side discharge jacket (15). The upstream side discharge jacket (14) is disposed apart from tail tube inlet (2) at position close to by-pass passage (10) so as to form non-cooled zone (A) in the vicinity of the tail tube inlet (2). On the downstream side thereof, the supply jacket (16) is disposed at position in tail tube (1) contracting portion and near the downstream side discharge jacket (15) so as to shorten length of cooling pipes there.

3 Claims, 2 Drawing Sheets

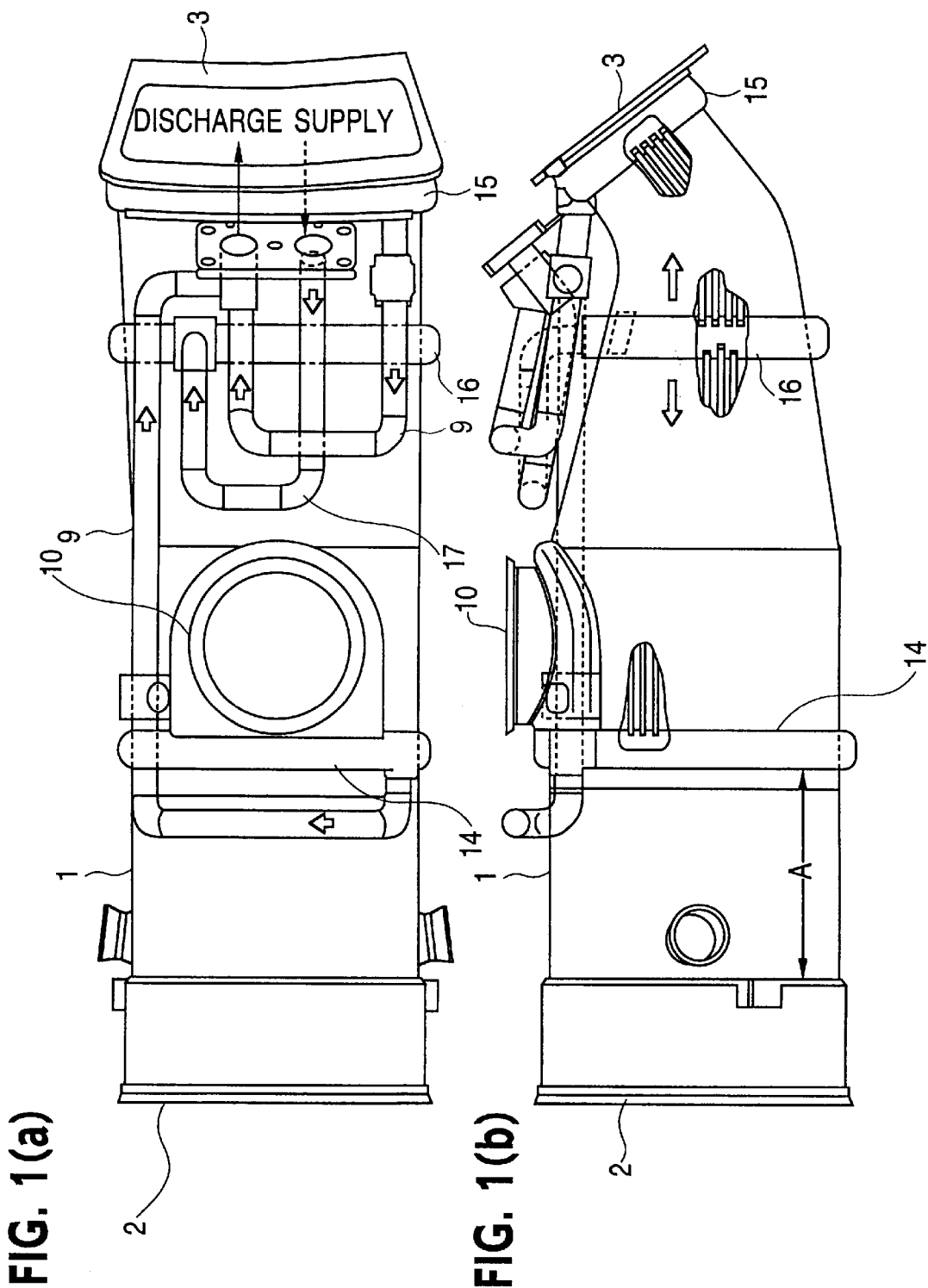

COOLING STRUCTURE FOR COMBUSTOR TAIL PIPES

This is a 371 of PCT/JP98/01641 filed Apr. 9, 1998.

BACKGROUND OF THE INVENTION

1. Field of the Invention

The present invention relates to a cooling structure of a gas turbine combustor tail tube which is cooled by steam as cooling medium.

2. Description of the Prior Art

A combined cycle power plant consists of the combination of a gas turbine plant and a steam turbine plant, wherein a gas turbine takes charge of a high temperature section of thermal energy and a steam turbine takes charge of a low temperature section thereof so as to recover the thermal energy for effective use thereof, and is a power system which is now paid high attention.

In the combined cycle power plant, as a means for enhancing the efficiency, such a cooling system as uses steam from a bottoming cycle, in place of using air, is being disclosed for cooling of a high temperature portion of the gas turbine.

One example thereof will be described with reference to FIG. 2. FIG. 2 shows a prior art cooling structure of a tail tube 1 of a gas turbine combustor. The tail tube 1 is constructed with a tail tube inlet 2 which connects to an upstream combustion chamber (not shown), a tail tube outlet 3 which connects to a downstream turbine (not shown) and a by-pass passage 10, disposed therebetween, which connects to a compressed air chamber (not shown).

The tail tube also includes an inlet side jacket 4 in the vicinity of the tail tube inlet 2, an outlet side jacket 5 in the vicinity of the tail tube outlet 3 and a joining jacket 6 spaced apart from the outlet side jacket 5 by a distance B in the vicinity of the by-pass passage 10.

A cooling steam supply pipe 7 connects to the inlet side jacket 4, a cooling steam supply pipe 8 connects to the outlet side jacket 5 and a cooling steam discharge pipe 9 connects to the joining jacket 6. It is to be noted that, although not shown in the figure, there are provided on an inner wall portion of the tail tube 1 a multiplicity of cooling pipes for leading therethrough a cooling steam from the inlet side jacket 4 and the outlet side jacket 5 to the joining jacket 6.

In the prior art cooling structure of the tail tube constructed as above, the cooling steam supplied from the bottoming cycle enters the inlet side jacket 4 and the outlet side jacket 5, respectively, and then the multiplicity of cooling pipes provided on the inner wall portion of the tail tube 1.

The cooling steam which has entered the inlet side jacket 4 flows in a forwarding flow direction from upstream side to downstream side to cool the inner wall portion of the tail tube 1 and the cooling steam which has entered the outlet side jacket 5 flows in the opposite or adverse flow direction from downstream side to upstream side to cool the inner wall portion of the tail tube 1.

Then, both flows join in the joining jacket 6 to be further sent to downstream side via the cooling steam discharge pipe 9 so as to recover the thermal energy which has been received through the cooling of the inner wall portion.

In the prior art cooling structure of the tail tube as mentioned above, the cooling steam flows in mutually opposing directions, hence if observed separately on the upstream side and on the downstream side of the joining jacket 6, then on the upstream side first, the cooling steam is supplied to a portion where a thermal load is comparatively low to further flow to cool the inner wall of the tail tube 1 with the result that the portion may be cooled excessively sometimes.

On the other hand, on the downstream side, in order to lead combustion gas securely to a gas turbine nozzle, such work of a tail tube outlet 3 portion is needed as to transform a cross sectional shape of the tail tube 1 from an upstream circle shape to a downstream fan shape as the tail tube 1 is contracted toward the tail tube outlet 3 and at same time to bend an axis of the tail tube outlet 3 portion so as to be parallel with a rotor. Thus, the cross sectional area of the tail tube 1 is contracted gradually toward the tail tube outlet 3 so that the flow velocity of the combustion gas is increased resulting in a high thermal load there.

Also, combustion reaction progresses gradually toward the downstream side and influence of secondary flow etc. at the bent portion is added thereto, thereby the thermal load there is further increased. Moreover, the distance B between the outlet side jacket 5 and the Joining jacket 6, which is approximately equal to that between the inlet side jacket 4 and the joining jacket 6, is considerably long, hence the cooling steam which is introduced into the outlet side jacket 5 and sent to the joining jacket 6 cannot be expected to effect sufficient cooling and the tail tube 1 on the downstream side of the joining jacket 6 is maintained in a state of high thermal load after all.

As the result of the above, there occurs a steep temperature distribution along an axial direction of the tail tube 1 between the upstream side of the joining jacket 6 and the downstream side thereof due to difference in the thermal load, and there is a problem that thermal stress of the tail tube 1 becomes larger.

SUMMARY OF THE INVENTION

In order to solve the problem in the prior art, it is an object of the present invention to provide a gas turbine combustor tail tube cooling structure constructed such that arrangement relationship and mounting position of an inlet side jacket, an outlet side jacket and the like as well as the supply directions of cooling steam, etc. are devised so as to make a temperature distribution along a tail tube axial direction gentle and to prevent a large thermal stress from occurring.

In order to attain the object, a first invention hereof provides a combustor tail-tube cooling structure. The combustor tail tube is provided with a plurality of cooling pipes for cooling a tail tube inner wall surface. In particular, the tail tube is provided with a supply jacket which is connected to the plurality of cooling pipes for supplying a cooling steam thereinto. The cooling steam flowing toward an upstream side of the tail tube via the plurality of cooling pipes is collected in an upstream side discharge jacket to be then sent to a discharge port via a discharge pipe and the cooling steam flowing toward a downstream side of the tail tube via the plurality of cooling pipes is collected in a downstream side discharge jacket to be then sent to the discharge port via a discharge pipe, and the supply jacket is disposed between the upstream side discharge jacket and the downstream side discharge jacket at a position in a tail tube contracting portion and near the downstream side discharge jacket.

That is, according to the first invention, the entire arrangement is made such that the supply jacket is disposed between the upstream side jacket and the downstream side jacket, wherein the upstream side jacket and the downstream side jacket are used as discharge jackets, respectively. Also, on the downstream side of the upstream side discharge jacket, the supply jacket of the cooling steam is disposed at the position in the tail tube contracting portion and near the downstream side discharge jacket, thereby the distance between the supply jacket and the downstream side discharge jacket and thus the length of the plurality of cooling pipes there are shortened greatly and sufficient cooling can be effected there.

Also, a second invention provides a combustor tail tube cooling structure as mentioned in the first invention, characterized in that the upstream side discharge jacket is disposed apart from a tail tube inlet at a position close to a by-pass passage connecting to a compressed air chamber so that a non-cooled zone is formed in the vicinity of the tail tube inlet.

That is, according to the second invention, the entire arrangement is made such that the supply jacket is disposed between the upstream side jacket and the downstream side jacket, wherein the upstream side jacket and the downstream side jacket are used as discharge jackets, respectively, and the upstream side discharge jacket is disposed apart from the tail tube inlet at the position close to the by-pass passage so as to form the non-cooled zone in the vicinity of the tail tube inlet. Further, as mentioned in the first invention, the supply jacket is disposed at the position in the tail tube contracting portion and near the downstream side discharge jacket so as to shorten the length of the plurality of cooling pipes. Thereby, excessive cooling in the vicinity of the tail tube inlet is prevented and a sufficient cooling on the downstream side of the supply jacket is secured with the result that the temperature distribution along a tail tube axial direction becomes gentle and a large thermal stress is prevented from occurring.

Also, a third invention provides a combustor tail tube cooling structure as mentioned in the first invention, characterized in that the downstream side discharge jacket is disposed at a position of a tail tube outlet.

That is, according to the third invention, the downstream side discharge jacket is disposed at the position of the tail tube outlet, thereby the plurality of cooling pipes on the downstream side of the supply jacket extend from the position in the tail tube contracting portion and near the downstream side discharge jacket to the position of the tail tube outlet where the downstream side discharge jacket is disposed and the cooling in this zone can be effected sufficiently and securely.

Further, a fourth invention hereof provides a combustor tail tube cooling structure as mentioned in the second invention, characterized in that the downstream side discharge jacket is disposed at a position of a tail tube outlet.

That is, according to the fourth invention, the downstream side discharge jacket is disposed at the position of the tail tube outlet, thereby there are formed the non-cooled zone in the vicinity of the tail tube inlet, as mentioned in the second invention, and the zone on the downstream side of the supply jacket where the sufficient and secure cooling is effected with the result that the temperature distribution along the tail tube axial direction becomes gentle for entire zone from the tail tube inlet to the tail tube outlet and a large thermal stress is prevented from occurring.

BRIEF DESCRIPTION OF THE DRAWINGS

FIGS. 1(a)–1(b) show a gas turbine combustor tail tube of one embodiment according to the present invention wherein FIG. 1(a) is a plan view thereof and FIG. 1(b) is a side view thereof.

FIGS. 2(a)–2(b) show a prior art gas turbine combustor tail tube, wherein FIG. 2(a) is a plan view thereof and FIG. 2(b) is a side view thereof.

DETAILED DESCRIPTION OF THE PREFERRED EMBODIMENTS

Figure 2A:
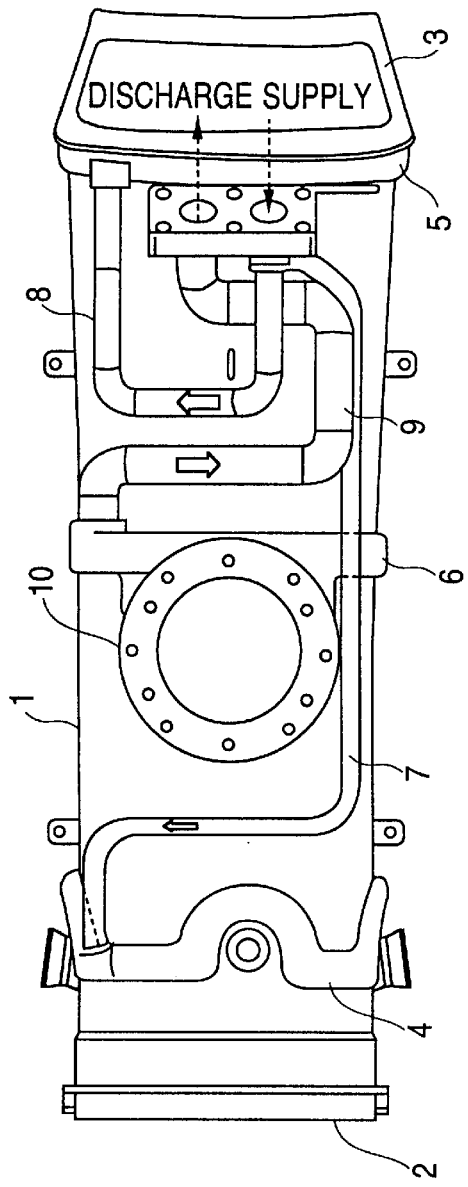
Figure 2B:
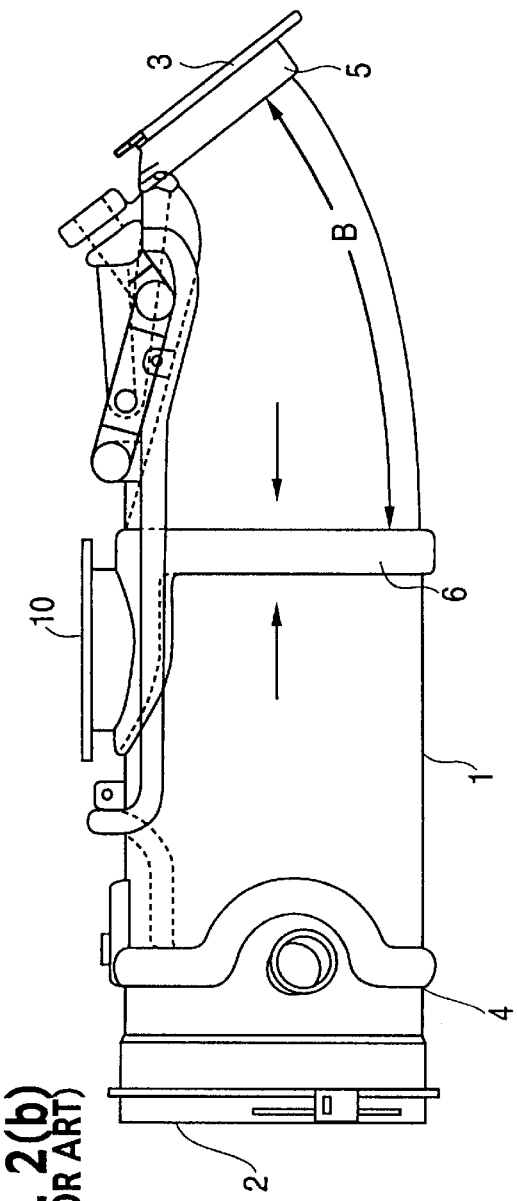

One embodiment according to the present invention will be described with reference to FIG. 1. It is to be noted that same parts or components as those described above with respect to the prior art case are identified with the same reference numerals in the figure to facilitate the understanding of the mutual relationship and repeated description therefor is omitted as much as possible.

In FIG. 1, numeral 16 designates a supply jacket for cooling steam. The supply jacket 16 is provided at a position which is located in a contracting portion of a tail tube 1 and is biased near to a tail tube outlet 3 as well as at which the tail tube 1, being contracted gradually, begins to be transformed into a fan shape cross section so as to meet a downstream gas turbine nozzle. The position of the supply jacket 16 is selected as a position from which the cooling steam is supplied into the tail tube 1 of a combustor.

Numeral 15 designates a downstream side discharge jacket provided at a position of the tail tube outlet 3. The supply jacket 16 is provided in the tail tube contracting portion so as to approach the downstream side discharge jacket 15, hence the length of a multiplicity of cooling pipes provided on an inner wall portion of the tail tube 1, as shown schematically in cut-away portions in the figure, is shortened greatly.

Numeral 14 designates an upstream side discharge jacket provided upstream of a by-pass passage 10 and in close vicinity thereto. This by-pass passage 10 is disposed approximately at a central position of the tail tube 1 in an axial direction thereof apart from a tail tube inlet 2, thereby a non-cooled zone A is to be formed between the tail tube inlet 2 and the upstream side discharge jacket 14.

Numeral 17 designates a supply pipe for supplying the cooling steam into the supply jacket 16 and numeral 9 designates a discharge pipe for carrying therethrough the cooling steam to a downstream recovery section (not shown). The cooling steam having theretofore cooled an interior of the tail tube 1 and been sent to the upstream side discharge jacket 14 and the downstream side discharge jacket 15, respectively.

In the present embodiment mentioned above, there are provided the upstream side discharge jacket 14 and the downstream side discharge jacket 15 with the supply jacket 16 of the cooling steam being disposed therebetween, thereby the cooling steam which has entered an inner wall portion of the tail tube 1 from the supply jacket 16 passes through a multiplicity of cooling pipes, as shown schematically in cut-away portions in the figure, for cooling the inner wall portion of the tail tube 1 and is then sent further downstream via the upstream side discharge jacket 14 or the downstream side discharge jacket 15 and the discharge pipe 9 of the cooling steam so that the thermal energy received through the cooling of the inner wall is recovered.

In the mentioned embodiment, on a downstream portion of the tail tube 1 where a thermal load is high, the supply jacket 16 of the cooling steam and the downstream side discharge jacket 15 are provided near to each other so that the length of the cooling pipes therebetween is shortened, hence sufficient cooling becomes possible. Also, on an upstream portion of the tail tube 1 where the thermal load is not so high, the non-cooled zone A is formed so as not to effect excessive cooling, hence the temperature distribution from the tail tube inlet 2 to the tail tube outlet 3 becomes gentle, and there is no fear of a large thermal stress occurring in the tail tube 1 and both safety and reliability are enhanced.

The invention has been described with respect to the embodiment as illustrated but the invention is not limited to said embodiment but needless to mention may be provided with various modifications in the concrete structure within the scope of the invention as claimed hereinbelow.

According to the present invention, the entire arrangement of the gas turbine combustor tail tube cooling structure is made such that the supply jacket is disposed between the upstream side jacket and the downstream side jacket, wherein the upstream side jacket and the downstream side jacket are used as discharge jackets, respectively. Also, the upstream side discharge jacket is disposed apart from the tail tube inlet at a downstream position close to the by-pass passage so as to form the non-cooled zone in the vicinity of the tail tube inlet, and on the downstream side thereof, the supply jacket is disposed at a position in the tail tube contracting portion and near the downstream side discharge jacket so as to shorten the length of the plurality of cooling pipes, between the supply jacket and the downstream side discharge jacket. Thereby, excessive cooling in the tail tube upstream portion where the thermal load is not so high is prevented and cooling in the tail tube downstream portion where the thermal load is high is effected sufficiently with the result that a temperature distribution along the tail tube axial direction is made gentle and a large thermal stress is prevented from occurring, thus safety and reliability of the combustor tail tube are enhanced greatly.

What is claimed is:

1. A combustor tail tube cooling structure comprising:

a combustor tail tube provided with a tail tube inlet, a tail tube outlet, a tail tube contracted portion, and a plurality of cooling pipes for cooling an inner wall surface of said combustor tail tube;

a supply jacket for supplying cooling steam into said plurality of cooling pipes;

an upstream side discharge jacket communicating with said supply jacket via said cooling pipes;

a first discharge pipe extending between said upstream side discharge jacket and a discharge port, wherein cooling steam flowing toward an upstream side of said tail tube via said plurality of cooling pipes is collected in said upstream side discharge jacket and is then sent to said discharge port via said first discharge pipe;

a downstream side discharge jacket communicating with said supply jacket via said cooling pipes;

a second discharge pipe extending between said downstream side discharge jacket and said discharge port, wherein cooling steam flowing toward an downstream side of said tail tube via said plurality of cooling pipes is collected in said downstream side discharge jacket and is then sent to said discharge port via said second discharge pipe, wherein said supply jacket is disposed between said upstream side discharge jacket and said downstream side discharge jacket, and said supply jacket is positioned in said tail tube contracted portion such that said supply jacket is positioned nearer to said downstream side discharge jacket than to said upstream side discharge jacket; and a by-pass passage for connecting to a compressed air chamber, wherein said upstream side discharge jacket is disposed apart from said tail tube inlet and close to said by-pass passsage so that a non-cooled zone is formed in a portion of said combustor tail tube extending from said tail tube inlet to said upstream side discharge jacket.

2. A combustor tail tube cooling structure as claimed in claim 1, wherein said downstream side discharge jacket is disposed at said tail tube outlet.

3. A combustor tail tube cooling structure comprising:

a combustor tail tube provided with a tail tube inlet, a tail tube outlet, a tail tube contracted portion, and a plurality of cooling pipes for cooling an inner wall surface of said combustor tail tube;

a supply jacket for supplying cooling steam into said plurality of cooling pipes;

an upstream side discharge jacket communicating with said supply jacket via said cooling pipes;

a first discharge pipe extending between said upstream side discharge jacket and a discharge port, wherein cooling steam flowing toward an upstream side of said tail tube via said plurality of cooling pipes is collected in said upstream side discharge jacket and is then sent to said discharge port via said first discharge pipe;

a downstream side discharge jacket communicating with said supply jacket via said cooling pipes;

a second discharge pipe extending between said downstream side discharge jacket and said discharge port, wherein cooling steam flowing toward an downstream side of said tail tube via said plurality of cooling pipes is collected in said downstream side discharge jacket and is then sent to said discharge port via said second discharge pipe, wherein said supply jacket is disposed between said upstream side discharge jacket and said downstream side discharge jacket, and said supply jacket is positioned in said tail tube contracted portion such that said supply jacket is positioned nearer to said downstream side discharge jacket than to said upstream side discharge jacket; and a by-pass passage for connecting to a compressed air chamber, wherein said upstream side discharge jacket is disposed immediately adjacent to said by-pass passage so as to establish a substantial non-cooled zone of said combustor tail tube that extends from said tail tube inlet to said upstream side discharge jacket.

* * * * *